(12) United States Patent
Kuppan et al.

(10) Patent No.: US 9,475,581 B2
(45) Date of Patent: Oct. 25, 2016

(54) ADJUSTABLE RESTRAINT ASSEMBLIES

(71) Applicant: Goodrich Corporation, Charlotte, NC (US)

(72) Inventors: Skandan Berikai Kuppan, Bangalore (IN); Bharath Marappan, Bangalore (IN); Mallikarjun Awarad, Bangalore (IN); Jeff Werbelow, Phoenix, AZ (US); Mark Olson, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 10 days.

(21) Appl. No.: 14/509,713

(22) Filed: Oct. 8, 2014

(65) Prior Publication Data

US 2016/0101864 A1    Apr. 14, 2016

(51) Int. Cl.
*B60P 7/08*      (2006.01)
*B64D 9/00*      (2006.01)
*B60P 7/135*      (2006.01)

(52) U.S. Cl.
CPC ............... *B64D 9/00* (2013.01); *B60P 7/0892* (2013.01); *B60P 7/135* (2013.01); *B64D 9/003* (2013.01)

(58) Field of Classification Search
CPC ......... B60P 7/0892; B60P 7/135; B64D 9/00
USPC ............... 410/77, 78, 79, 80, 90, 92, 94, 95; 244/118.1, 137.1
See application file for complete search history.

(56) References Cited

U.S. PATENT DOCUMENTS

| | | | |
|---|---|---|---|
| 3,168,205 A * | 2/1965 | Green | B60P 7/08 254/104 |
| 5,310,297 A * | 5/1994 | Benjamin | B60P 7/0815 410/77 |
| 6,425,717 B1 * | 7/2002 | Saggio | B60P 7/13 410/77 |

* cited by examiner

*Primary Examiner* — Stephen Gordon
(74) *Attorney, Agent, or Firm* — Snell & Wilmer, L.L.P.

(57) ABSTRACT

Systems and methods are disclosed herein for guide assemblies. A guide assembly is provided comprising a sliding rail comprising a first channel and a second channel, a first fitting comprising a first retaining rail, wherein the first retaining rail is configured to slide within the first channel, and a second fitting comprising a second retaining rail, wherein the second retaining rail is configured to slide within the second channel.

9 Claims, 6 Drawing Sheets

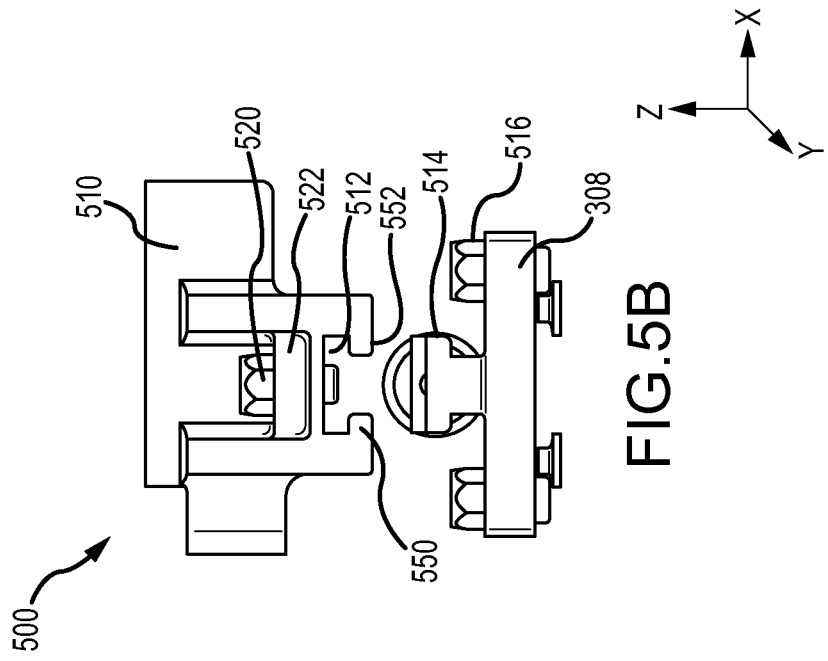
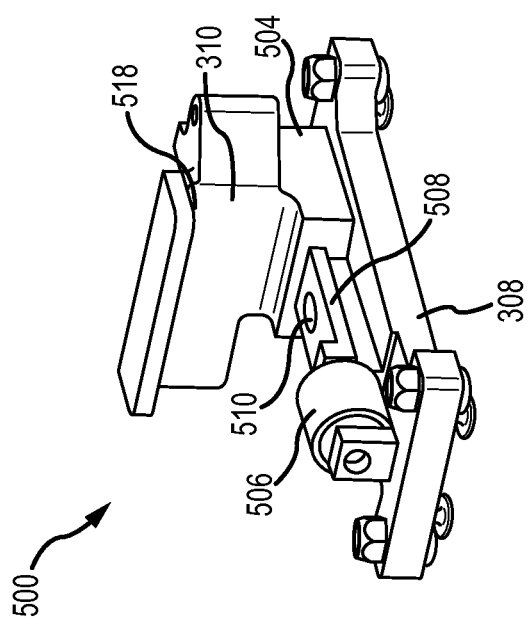
FIG.5B
FIG.5A

ADJUSTABLE RESTRAINT ASSEMBLIES

FIELD

The present disclosure relates generally to cargo management systems. More particularly, the present disclosure relates to cargo management systems that restrain cargo with respect to a vehicle, such as an aircraft.

BACKGROUND

Conventional aircraft cargo systems typically include various tracks and rollers that span the length of an aircraft. Rollers are driven by power drive units ("PDUs") that convey cargo forward and aft. Cargo is typically loaded from an aft position on an aircraft and conducted by the cargo system to a forward position. Conventional systems are typically designed to accommodate a particular pallet size.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A guide assembly is provided comprising a sliding rail comprising a first channel and a second channel, a first fitting comprising a first retaining rail, wherein the first retaining rail is configured to slide within the first channel, and a second fitting comprising a second retaining rail, wherein the second retaining rail is configured to slide within the second channel.

A restraint assembly is provided comprising a restraining stop comprising a first channel, a first fitting comprising a first retaining rail, wherein the first retaining rail is configured to slide within the first channel, and a roller disposed in the first fitting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIGS. 5A and 5B illustrate a restraint assembly, in accordance with various embodiments.

DETAILED DESCRIPTION

Figure 1:
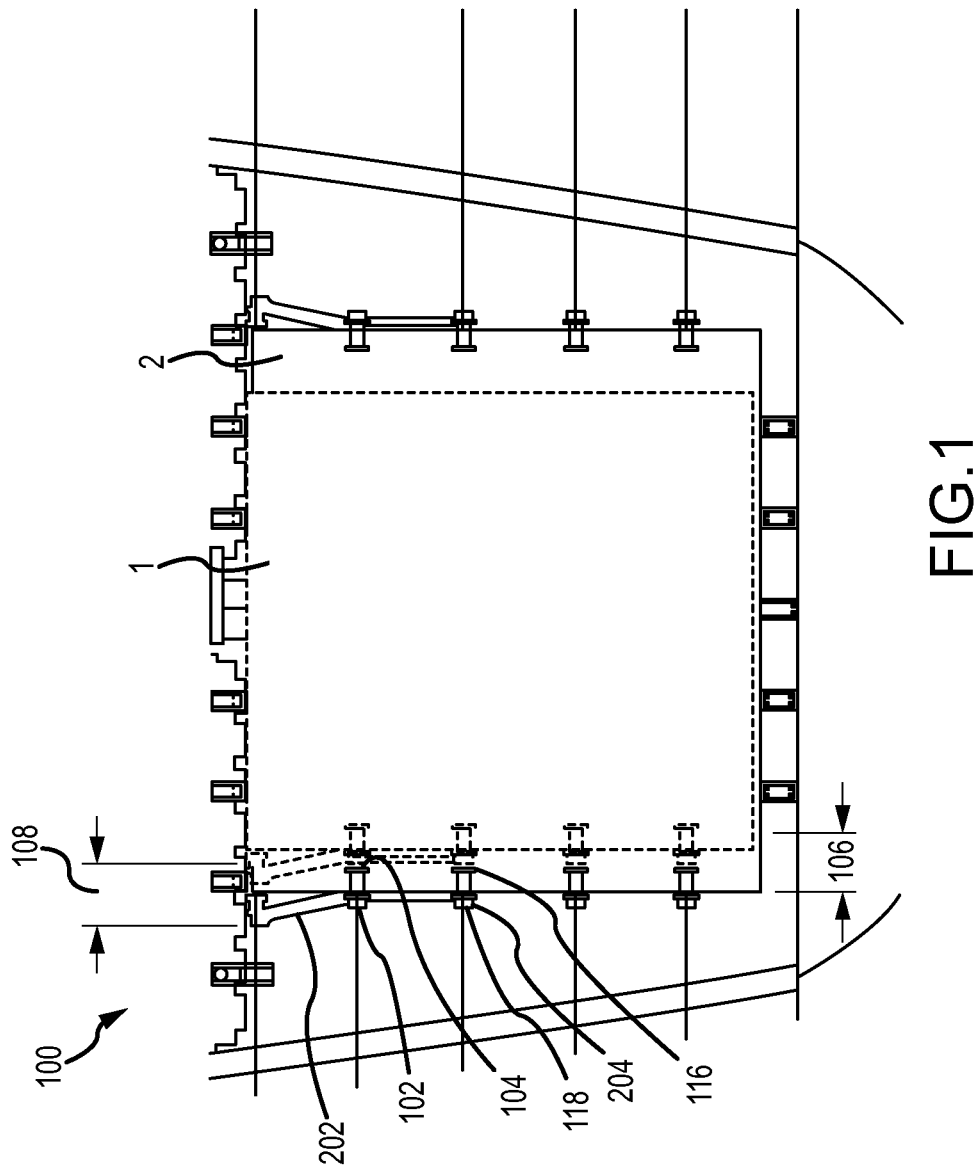
FIG. 1 illustrates two different sized pallets in an aircraft cargo management system, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

An aircraft cargo management system may comprise various guide assemblies (also known as "lead-in-guide assemblies") and restraint assemblies. Cargo may be loaded from a forward position on an aircraft and moved to an aft position. The guide assemblies facilitate a cargo pallet to engage with restraint assemblies, for example, by facilitating a change in the direction and/or orientation at locations where the cargo area is either reduced or increased. Cargo pallets may then be secured to, among other things, the restraint assemblies to restrain the pallet from motion relative to the restraint assemblies.

Depending upon customer requests, different sized pallets may be used with aircraft cargo management system. Conventionally, significant modification of an aircraft cargo management system would be associated with changing from accommodating one pallet size to another, including the use of many alternate parts and the expenditure of a significant amount of labor.

However, as disclosed here, in various embodiments, aircraft cargo management systems are provided herein that may accommodate multiple pallet sizes. In that regard, guide assemblies and restraint assemblies are provided that may adjust to accommodate different pallet widths.

In various embodiments, guide assemblies and restraint assemblies are provided that are configurable to take on one or more positions to accommodate varying pallet sizes. In that regard, as provided herein, guide assemblies and restraint assemblies may have a portion that mounts to an aircraft (a "mounted portion") and a portion that is configured to change position with respect the mounted portion (a "slidable portion"). In various embodiments, a rail and channel structure is used to allow the slidable portion to engage with and slide with respect to the mounted portion. Also in various embodiments, a locking system such as a torque kit comprising a bolt or screw may be used to restrain the slidable portion from sliding with respect to the mounted portion. In that manner, the slidable portion may be positioned with respect to the mounted portion such that a pallet of a first width may be accepted and the slidable portion may be then secured with respect to the mounted portion via a locking system. As desired, the locking system may be unlocked and the slidable portion may be positioned again with respect to the mounted portion such that a pallet of a second width may be accepted, wherein the first width and the second width are different.

Figure 2:
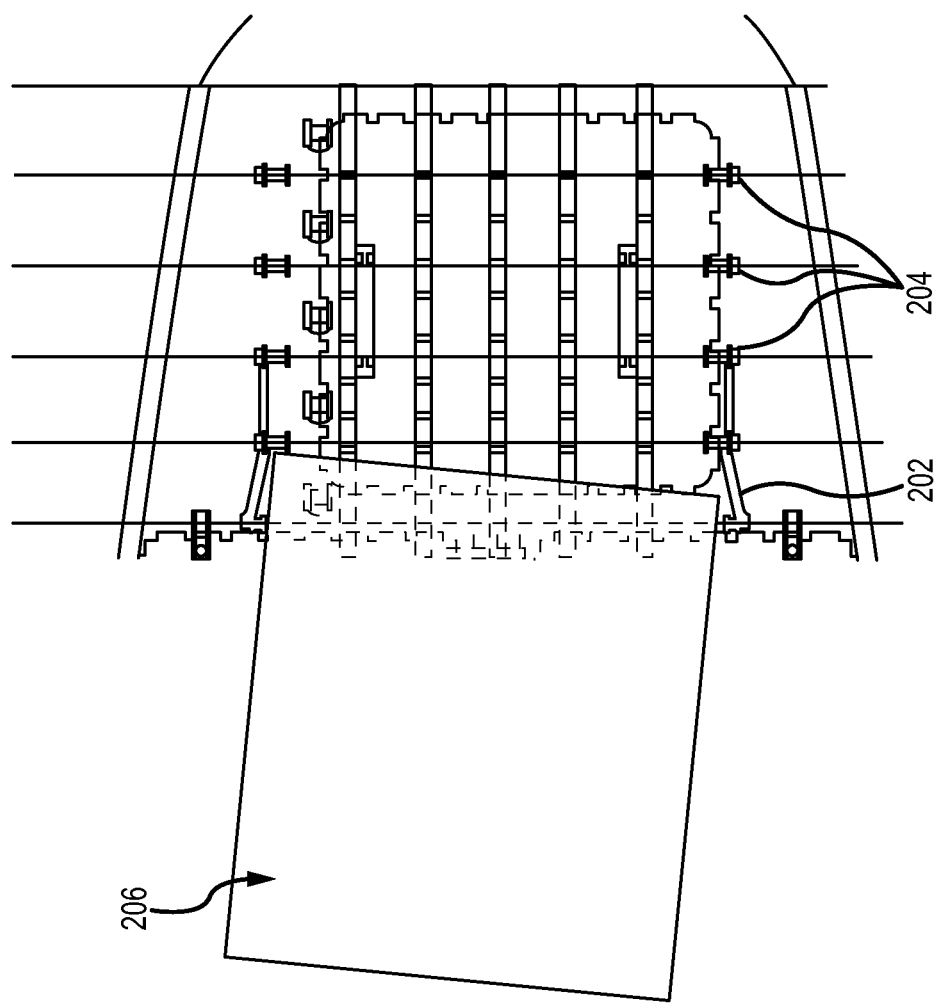
FIG. 2 illustrates a pallet in an aircraft cargo management system, in accordance with various embodiments.

Commonly used pallet widths are the W1 pallet that has a width of 108" and a W2 pallet that has a width of 125." With reference to FIG. 1, a W2 pallet is labeled as pallet 2 and is shown overlayed with W1 pallet labeled as pallet 1. As shown, guide assembly 202 in position 102 is shown in a configuration to accept pallet 2 and guide assembly 202 in position 104 is shown in a configuration to accept pallet 1. The difference in width between the configuration for pallet 1 and pallet 2 of guide assembly 202 is shown as distance 108. Restraint assemblies 204 in position 118 are shown in a configuration to accept pallet 2 and restraint assemblies 204 in position 116 are shown in a configuration to accept pallet 1. The difference in width between the configuration for pallet 1 and pallet 2 of restraint assemblies 204 is shown as distance 106. With reference to FIG. 2, pallet 206 is shown engaging with guide assembly 202. The incline of sliding rail of guide assembly 202 interacts with pallet 206 to position the pallet with respect to restraint assemblies 204.

Figure 3:
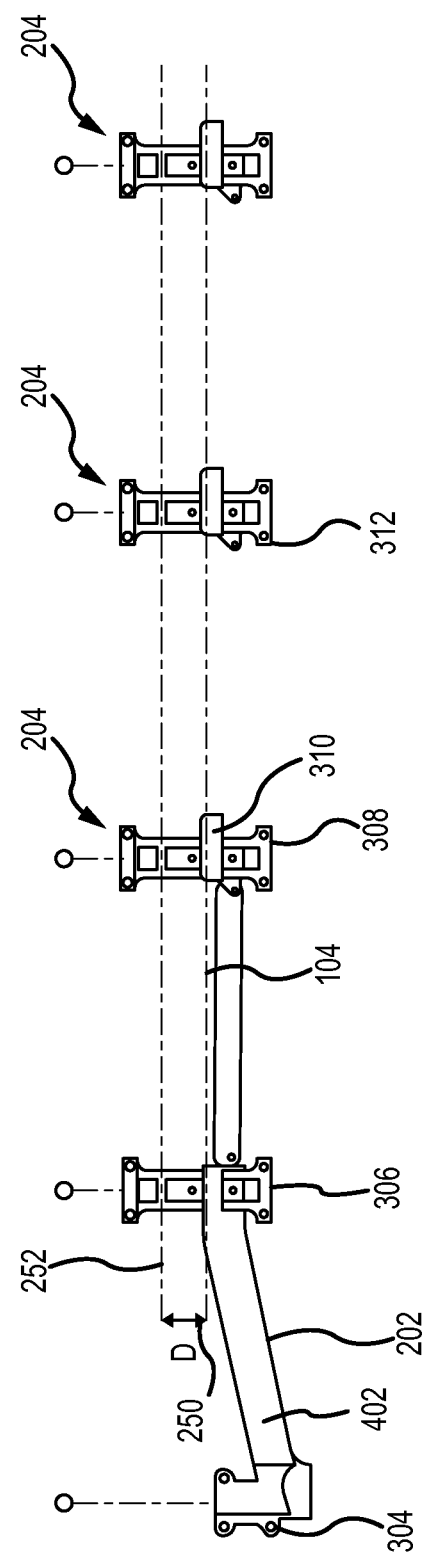
FIG. 3 illustrates an adjustable width aircraft cargo management system in accordance with various embodiments.

With reference to FIG. 3, an overhead view of an aircraft cargo management system is shown. Guide assembly 202 and restraint assemblies 204 are shown fixed to an aircraft, for example, an aircraft floor and/or other attachment features that couple guide assembly 202 and restraint assemblies 204 to the aircraft. Guide assembly 202 is shown forward of restraint assemblies 204. Guide assembly 202 comprises sliding rail 402, first fitting 304 and second fitting 306. Restraint assembly 204 comprises restraint fitting 308 and rail 310. First fitting 304, second fitting 306 and restraint fitting 308 are mounted to aircraft floor 312. In that regard, first fitting 304, second fitting 306 and restraint fitting 308 may be considered mounted portions.

To accommodate different pallets, and as described below, the sliding rail 402 of guide assembly 202 and rail 310 of restraint assemblies 204 may be moved inward or outward while first fitting 304, second fitting 306 and restraint fitting 308 remain fixed with respect to aircraft floor 312. In that regard, the sliding rail 402 of guide assembly 202 and rail 310 of restraint assemblies 204 may be considered slidable portions. In that regard, a first position 250 is shown along with second position 252. The difference between first position 250 and first position 250 is distance D. In various embodiments, distance D may be between 0.5 inches (~1.27 cm) and 6 inches (~15.24 cm), between 1 inch (~2.54 cm) and 4 inches (~10.16 cm), and about 2.5 inches (~6.35 cm), where the term "about" in this context only means+/-0.2 inches (~0.5 cm).

Figure 4A:
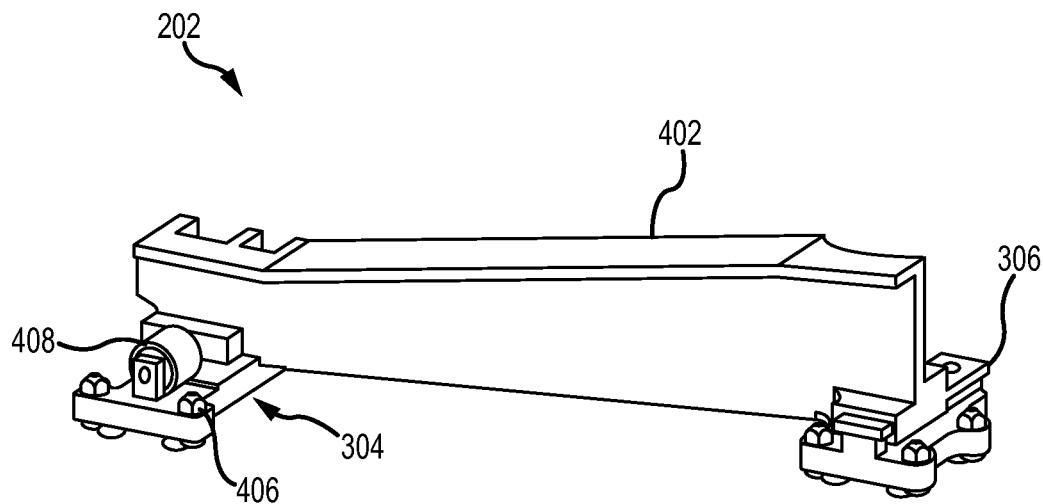
FIGS. 4A, 4B and 4C illustrate a guide assembly, in accordance with various embodiments.
Figure 4B:
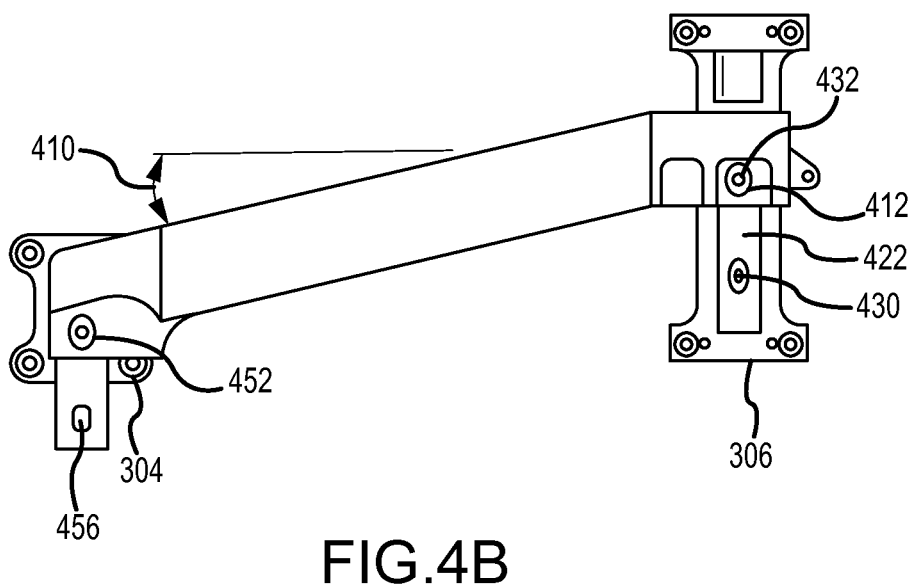
Figure 4C:
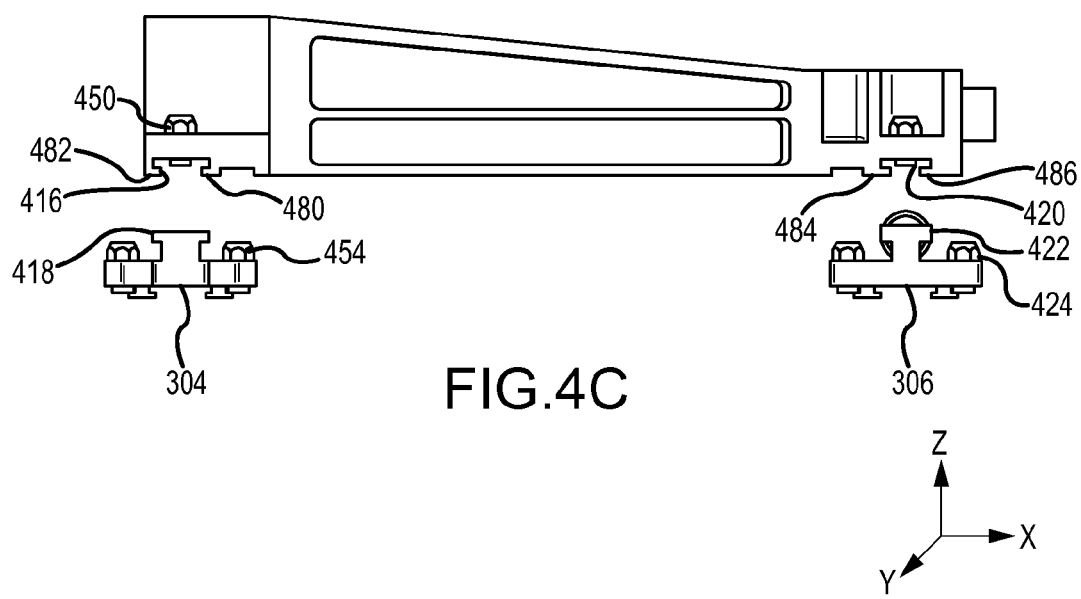

With reference to FIGS. 4A-4C, guide assembly 202 is illustrated. Sliding rail 402 is shown engaged with first fitting 304 and second fitting 306 in FIGS. 3, 4A and 4B and disengaged from first fitting 304 and second fitting 306 in FIG. 4C.

Sliding rail 402 comprises channels 416 and 420. A channel in sliding rail 402 may be any aperture, cutout, or other opening in sliding rail 402. The interior portion of channels 416 and 420 may comprise one or more retaining features such as retaining tabs, notches, grooves, threads, or other suitable features. For example, channels 416 and 420 each comprise an inverse T shape. In that regard, each of channels 416 and 420 comprise two retaining tabs. Channel 416, for example, includes two retaining tabs 480 and 482 that are configured to mate to a T shaped rail. The retaining tabs 480 and 482 are configured to mate to a T shaped rail and restrain sliding rail 402 from separation from, for example, first fitting 304. Channel 420, for example, includes two retaining tabs 484 and 486 that are configured to mate to a T shaped rail. The retaining tabs 484 and 486 are configured to mate to a T shaped rail and restrain sliding rail 402 from separation from, for example, second fitting 306. For example, the retaining tabs 484, 486 and 480, 482 are configured to mate to a T shaped rail and restrain sliding rail 402 in a z direction.

First fitting 304 comprises first retaining rail 418 and second fitting 306 comprises second retaining rail 422. Both first retaining rail 418 and second retaining rail 422 comprise a T shape. However, in various embodiments, first retaining rail 418 and second retaining rail 422 may comprise any suitable geometry that is configured to mate with channels 416 and 420. First retaining rail 418 and second retaining rail 422 may comprise a depression 430. Depression 430 may comprise an indentation or similar feature extending in the z direction. A bolt from a shear kit 432 may be disposed in counterbore 412 of sliding rail 402. Counterbore 412 may comprise an indentation in sliding rail 402 and an aperture that proceeds through sliding rail 402. In that regard, a bolt from a shear kit 432 may be disposed in counterbore 412 and pass into depression 430. The shear kit 432 may be appropriately torqued to couple sliding rail 402 to second retaining rail 422 of second fitting 306. Sliding rail 402 may comprise angle 410. Angle 410 may assist in the positioning of cargo within an aircraft. In various embodiments, angle 410 may be between 5 degrees and 15 degrees.

In like manner, a bolt from a shear kit 450 may be disposed in counterbore 452 of sliding rail 402. Counterbore 452 may comprise an indentation in sliding rail 402 and an aperture that proceeds through sliding rail 402. In that regard, a bolt from a shear kit 450 may be disposed in counterbore 452 and pass into depression 456 on first retaining rail 418 of first fitting 304. The shear kit 450 may be appropriately torqued to couple sliding rail 402 to first retaining rail 418 of first fitting 304.

First fitting 304 may comprise shear kit 454 that may couple first fitting 304 to an aircraft. Second fitting 306 may comprise shear kit 424 that may couple second fitting 306 to an aircraft.

Guide assembly 202 is thus able to quickly and easily adapt to accept different sized pallets, for example, pallet 1 and pallet 2 shown in FIG. 1. In that regard, sliding rail 402 may engage with and slide with respect to first retaining rail 418 of first fitting 304 and second retaining rail 422 of second fitting 306. When the appropriate positioning is obtained to accept a given pallet size, a bolt from a shear kit 450 may be disposed in counterbore 452 and pass into depression 456 on first retaining rail 418 of first fitting 304. The bolt may be torqued, thereby restraining sliding rail 402 from sliding with respect to first fitting 304. In this manner, an aircraft cargo management system may adapt to accept different sized pallets more easily.

With reference to FIGS. 5A and 5B, restraint assembly 500 is shown in an assembled state (FIG. 5A) and an unassembled state (FIG. 5B). Restraint assembly 500 comprises restraint fitting 308 and rail 310, as also shown in FIG. 3.

Rail 310 comprises channel 512. Channel 512 in rail 310 may be any aperture, cutout, or other opening in rail 310. The interior portion of channel 512 may comprise one or more retaining features such as retaining tabs, notches, grooves, threads, or other suitable features. For example, channel 512 comprises an inverse T shape. In that regard, channel 512 comprises two retaining tabs 550 and 552. Channel 512, for example, includes two retaining tabs 550 and 552 that are configured to mate to a T shaped rail. The retaining tabs 550 and 552 are configured to mate to a T shaped rail and restrain restraint assembly 500 from separation from, for example, restraint fitting 308. For example, the retaining tabs 550 and 552 are configured to mate to a T shaped rail and restrain rail 310 in a z direction.

Restraint fitting 308 comprises first retaining rail 514. First retaining rail 514 comprises a T shape. However, in various embodiments, first retaining rail 514 may comprise any suitable geometry that is configured to mate with channel 512. First retaining rail 514 may comprise a depression 510. Depression 510 may comprise an indentation or similar feature extending in the z direction. A bolt from a shear kit 520 may be disposed in aperture 522 of rail 310. Aperture 522 may proceed through rail 310. In that regard, a bolt from a shear kit 520 may be disposed in aperture 522 and may pass into depression 510. The shear kit 520 may be appropriately torqued to couple rail 310 to restraint fitting 308. Shear kit 516 may secure restraint fitting 308 to an aircraft.

Rail 310 may comprise lip 518. Lip 518 may be configured to seat over a pallet of cargo. In that regard, lip 518 may restrain the movement of cargo in a Z direction in that a force in the Z direction on the cargo would be carried by the lip 518 through rail 310 and to the restraint fitting 308. Restraint fitting 308 may also comprise roller 506 to assist in moving cargo.

Restraint assembly 500 is thus able to quickly and easily adapt to accept different sized pallets, for example, pallet 1 and pallet 2 shown in FIG. 1. In that regard, rail 310 may engage with and slide with respect to retaining rail 514. When the appropriate positioning is obtained to accept a given pallet size, a bolt from shear kit 520 may be appropriately torqued to couple rail 310 to restraint fitting 308, thereby restraining rail 310 from sliding with respect to restraint fitting 308. In this manner, an aircraft cargo management system may adapt to accept different sized pallets more easily.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A restraint assembly comprising:
    a restraining stop comprising a first channel;
    a first fitting comprising a first retaining rail, wherein the first retaining rail is configured to slide within the first channel;
    a roller disposed in the first fitting, wherein
    the first retaining rail comprises a depression, and
    the first fitting comprises a shear kit configured to secure the first fitting to an aircraft, the shear kit being disposed in the restraining stop and configured so that the depression receives the shear kit, wherein, in response to the shear kit being engaged with the depression, the restraining stop is restrained from motion relative to the first fitting.

2. The restraint assembly of claim 1, wherein the first retaining rail comprises a T shape.

3. The restraint assembly of claim 2, wherein the first channel comprises a first retaining tab and a second retaining tab.

4. The restraint assembly of claim 3, wherein the first retaining tab and the second retaining tab are configured to mate with the first retaining rail to restrain the restraining stop from moving away from the first fitting.

5. The restraint assembly of claim 1, wherein the restraining stop has a first position with respect to the first fitting sized to accommodate a first pallet.

6. The restraint assembly of claim 5, wherein the restraining stop has a second position with respect to the first fitting sized to accommodate a second pallet.

7. The restraint assembly of claim 6, wherein the restraining stop moves from the first position to the second position in response to the retaining rail sliding within the first channel.

8. The restraint assembly of claim 1, wherein the shear kit comprises a bolt.

9. The restraint assembly of claim 1, wherein the first fitting comprises a lip configured to seat over a pallet.

* * * * *